US012771017B2

(12) United States Patent
Schwarz

(10) Patent No.: US 12,771,017 B2
(45) Date of Patent: Oct. 20, 2026

(54) LAMINATE AND PROCESS FOR PRODUCING SAME IN A MULTICOMPONENT PROCESS

(71) Applicant: Bayerische Motoren Werke Aktiengesellschaft, Munich (DE)

(72) Inventor: Manuel Schwarz, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 19/059,033

(22) Filed: Feb. 20, 2025

(65) Prior Publication Data

US 2025/0273849 A1 Aug. 28, 2025

(30) Foreign Application Priority Data

Feb. 23, 2024 (DE) ..................... 10 2024 105 103.5

(51) Int. Cl.
*B32B 3/10* (2006.01)
*B32B 3/18* (2006.01)
*H01Q 1/42* (2006.01)

(52) U.S. Cl.
CPC ............... *H01Q 1/422* (2013.01); *B32B 3/10* (2013.01); *B32B 3/18* (2013.01)

(58) Field of Classification Search
CPC .... B32B 3/10; B32B 3/18; B32B 3/22; B32B 3/30; B32B 3/085; H01Q 1/42
See application file for complete search history.

(56) References Cited

U.S. PATENT DOCUMENTS

2021/0376458 A1 12/2021 Holzleitner et al.

FOREIGN PATENT DOCUMENTS

| | | |
|---|---|---|
| DE | 10 2020 105 729 A1 | 9/2021 |
| DE | 10 2020 114 258 A1 | 12/2021 |
| EP | 2 640 609 B1 | 11/2016 |

OTHER PUBLICATIONS

German-language Search Report issued in German Application No. 10 2024 105 103.5 dated Apr. 4, 2024 with partial English translation (11 pages).

*Primary Examiner* — Elizabeth E Mulvaney
(74) *Attorney, Agent, or Firm* — Crowell & Moring LLP

(57) ABSTRACT

A method for producing a laminate in a multicomponent process and a laminate. The method includes generating a base substrate from a transparent plastic in a first fabrication step, coating the base substrate with a transparent resin layer in a second fabrication step, and applying a coating layer directly on a surface of the base substrate facing away from the transparent resin layer in a third fabrication step. The coating layer is a solid-color coating layer. Passages which extend from a side of the solid-color coating layer facing the transparent resin layer to a side of the solid-color coating layer facing away from the transparent resin layer are introduced into the solid-color coating layer and/or recesses which extend from a side facing away from the transparent resin layer partially into the solid-color coating layer are introduced into the solid-color coating layer.

9 Claims, 1 Drawing Sheet

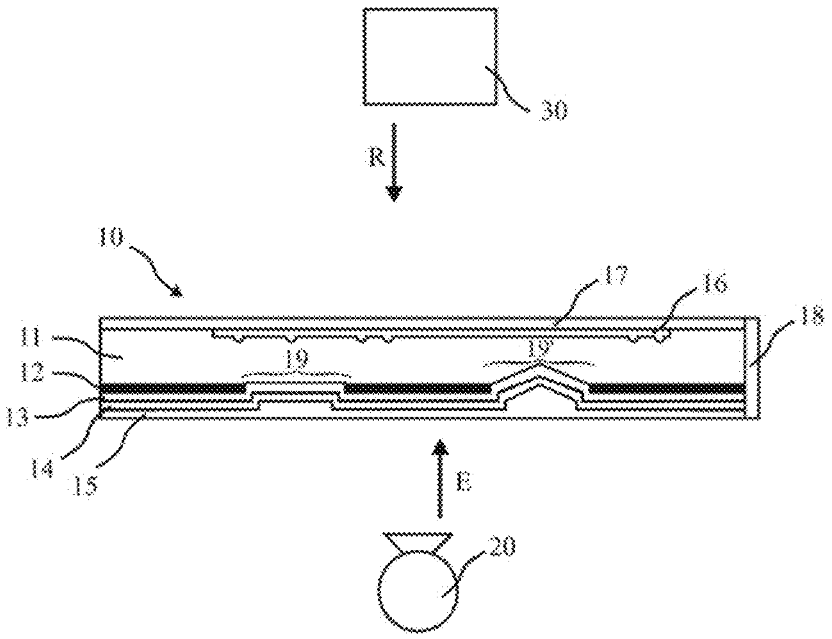
30
R
10
17
16
18
11
19
19
12
13
14
15
E
20

LAMINATE AND PROCESS FOR PRODUCING SAME IN A MULTICOMPONENT PROCESS

CROSS REFERENCE TO RELATED APPLICATION

This application claims priority under 35 U.S.C. § 119 from German Patent Application No. 10 2024 105 103.5, filed Feb. 23, 2024, the entire disclosure of which is herein expressly incorporated by reference.

BACKGROUND AND SUMMARY

The present invention relates to a process for producing a laminate and to a laminate.

In contemporary vehicle construction, there have been efforts for some time to realize automatedly driving vehicles. Radar-based systems are used to detect objects situated in the vehicle environment. Current radomes (covers in front of the front radar of the vehicle) consist of a multishell structure which usually consists of at least two injection-molded parts that have to be joined together. The two individual parts are then joined (e.g., by adhesive bonding) to form a construction which in the final state must be designed to be impervious to effects of media. A heater is mounted on the rear of these components in the non-visible region and must then heat the front side of the component through two plastic shells and through the air gap, resulting in increased energy consumption and/or poorer heating performance.

The present construction of the radomes with a two-shell structure and an air gap between the two shells, with regard to radar function, shows detection of objects which is dependent on temperature, humidity, etc.

The document EP 2 640 609 B1 shows a generic radome for vehicles.

Based on this prior art, the invention has the object of specifying a process for producing a laminate which is particularly suitable for use as a radome.

To achieve this object, the invention teaches a process for producing a laminate in a multicomponent process, with the steps of:

- generating a base substrate from a transparent plastic, in particular from polycarbonate, in a first fabrication step; and
- coating the base substrate with a transparent resin layer, in particular of polyurethane, in a second fabrication step.

The transparent resin layer can also be configured as a so-called hard coating. A hard coating can be a thermally cured, abrasion-resistant, weather-resistant and scratch-resistant silicone coating for polycarbonate substrates. The transparent resin layer can have self-healing properties. Preferably, the resin layer represents an outer side of the laminate. For the purposes of this patent application, a self-healing layer is a resin system which, in the case of scratches or spots, has a self-healing effect through heat exposure or time, by which the scratches are closed up again or spots disappear. This effect is produced, for example, by physical bonds (e.g., hydrogen bonds) in the resin layer, which are separated in the event of damage (e.g., scratches) and reform in the aftermath, as long as there is no chipping damage. This offers the advantage of increased scratch resistance, thereby maintaining permanently unrestricted functioning of the radar system even in the event of stone chipping or similar exposures. The wall thickness of the base substrate in conjunction with the transparent resin layer can be selected such that the wall thickness represents a multiple of the wavelength in the material for the radar-relevant frequency range. Hence a minimum attenuation for radar waves of defined frequency can be generated. The resin layer may have similar or equal radar permeability to the base substrate, to minimize reflections in the boundary layer. The resin layer can have a layer thickness in the range of 0.5 mm to 2.0 mm. Preferably, the layer thickness of the resin layer is in a range of 0.5 mm to 1.0 mm for realizing a shorter cycle time and reducing possible surface waviness. Compared to a double-shell construction, the multilayer component produced by the process offers increased design freedom, a more beneficial tolerance situation and improved radar and heating performance when used as a radome. Furthermore, a coating layer is applied directly to a surface of the base substrate facing away from the resin layer, the coating layer being a solid-color coating layer. The coating layer may have a defined radar transparency, which is preferably equal to the radar transparency of the base substrate and/or the resin layer and is applied in layer thicknesses of 5 μm to 50 μm. Preferably, a laserable, i.e., a laser beam-machinable or -removable, solid-color coating material is used. The shade of the solid-color coating material used corresponds to the basic shade of the desired metallic finish or the target metallic color impression.

Furthermore, passages can be introduced into the solid-color coating layer which extend from a side of the solid-color coating layer facing the resin layer to a side of the solid-color coating layer facing away from the resin layer. Alternatively or in addition, recesses can be introduced which extend from a side facing away from the resin layer partially into the solid-color coating layer. Through different intensities of the laser beam, the coating layer of the solid-color coating material can also be removed to differing degrees from passage to passage, i.e., fully removed solid-color coating layer for generating passages, or solid-color coating layer that is only significantly reduced in layer thickness for generating recesses, so resulting ultimately in different degrees of transparency. In a multicomponent process, a laminate is created in an injection molding process, with different materials and/or components being molded onto each other.

The passages and/or recesses can have different sizes.

The passages and/or recesses in their extent longitudinally to the solid-color coating layer can have a size of less than 0.5 mm.

The passages and/or recesses can be distributed evenly over the area of the solid-color coating layer.

The passages and/or recesses can be distributed without any recognizable pattern over the area of the solid-color coating layer.

After the base substrate has been generated, the base substrate can remain in the production mold, with the coating of the base substrate taking place while the base substrate is in the production mold. This eliminates additional handling steps, which has a positive effect on quality, especially in terms of tolerances, contaminations, and damage.

A transparent heating foil can be integrated between the base substrate and the resin layer. Preferably, the heating foil can consist of the same base material as the base substrate which is generated in the first production operation. This heating foil has a prescribed wire layout, where the wires are deposited on the foil surface and recessed at least partially, by means of vibration methods for example, into the foil. When these wires, which have a defined electrical resistance, are energized, the heat required to heat the radome is generated. The wires here are arranged such that the component surface is heated uniformly and over its full area.

The heating foil can be applied to a surface of the base substrate before the base substrate is coated, and can then be covered with the resin layer over the full area in a flooding operation, with the heating foil after coating being completely embedded between the resin layer and the base substrate. The resin layer here forms a front side of the laminar component. This ensures optimized heating performance of the front side of the component and prevents the heating foil from showing on the facing side of the component.

According to a first variant of the process, the coating layer can first be applied over the full area to the surface of the base substrate facing away from the resin layer, and then removed at least sectionally by means of laser ablation. The coating layer can be removed both in sections where the finished component has wall thickness discontinuities and in sections with a constant wall thickness. The former is the case particularly in the regions where a three-dimensional pattern is to be generated.

According to a second variant of the process, masking can be applied sectionally on a surface of the base substrate facing away from the resin layer, before a coating layer is applied, with the coating layer being applied in masked regions to the masking and in non-masked regions directly to the surface of the base substrate. Masked regions are provided in particular in the regions in which a two- or three-dimensional pattern is to be generated.

According to a third variant of the process, at least on a side of the base substrate facing away from the resin layer, a coating layer can be applied by means of a printing process, in particular by means of inkjet, digital printing or screen printing, with the coating layer being applied only sectionally to the surface of the base substrate and with regions having a coating layer and regions having no coating layer being obtained on this surface. As a result, the back side of the base substrate is selectively coated and a desired pattern is generated directly during application of the first paint. As a result, selective layer removal by means of laser is no longer necessary. Regions having no coating layer are provided in particular at places where a two- or three-dimensional pattern is to be generated.

According to a fourth variant, the coating layer can be generated by applying a hot-stamping foil to generate the first color layer. The layer thickness and the selection of material for the hot-stamping foil must be selected in an optimized way for the radar performance of the overall component.

According to a fifth variant, a printed or coated foil can be in-mold coated, directly during production of the base substrate, on the component surface opposite the additional resin layer, in order to generate the first color layer. In this case, before the base substrate is generated, the printed or coated color layer is introduced into the production mold in which the base substrate is generated. The printed or coated foil is then in-mold coated with the base substrate material. This method can likewise be used to generate a two- or three-dimensional pattern.

Furthermore, after the coating layer has been generated, a transparent adhesion promoter layer, in particular in a layer thickness of 5 μm to 50 μm, can be applied to the coating layer. The adhesion promoter layer serves to improve the adhesion of the following decorative layer and can be implemented with or without flatting agent to influence the optical effect of the following decorative layer—for example, gloss or semi-gloss. The transparent adhesion promoter layer as well is optimized for radar transparency in terms of composition and layer thickness.

A decorative layer of a semiconductor or of a semiconductor in combination with a conductor can be applied to the transparent adhesion promoter layer or directly to the solid-color coating layer by means of physical vapor deposition (PVD), in particular by means of sputtering. Coating by means of chemical vapor deposition is also possible. This decorative layer imparts a metallic appearance to the second color and is at the same time radar-transparent. The layer thickness of this decorative layer is between 10 nm and 300 nm, preferably between 15 nm and 80 nm, for a cost-efficient representation of the target colors. The layer is generated from silicon, germanium, boron, selenium, tellurium, arsenic or antimony or from mixtures of these elements. When using silicon, a metallic effect can be generated in chrome paints. Furthermore, a metal, in particular chromium, can be added to a small extent to the sputter-applied semiconductor material to represent a desired color of the decorative layer. This proportion should not exceed a proportion of 10% by volume to ensure radar-transparency. By applying the decorative layer directly to the solid-color coating layer, an optical gloss effect can be generated. In contrast, an optical matt effect, with which fabrication defects and contamination are optically concealed, can be generated by using an adhesion promoter layer.

A non-transparent topcoat can be applied to the decorative layer by means of spraying processes. The topcoat can have a layer thickness of 5 μm to 150 μm and have a radar-transparency such that its layer thickness is likewise optimized for radar performance. This topcoat is a final layer and serves at the same time to seal the back side of the component. The topcoat protects the rest of the layers against environmental effects and also against unwanted translucence/shine-through of the component from the back side. If such translucence or shine-through is desired, this topcoat must be made transparent accordingly. Alternatively, the topcoat can also be black in coloration. The eventual color of the decorative layer can be generated by the coloring of the topcoat, as the layer would otherwise be semitransparent.

Furthermore, the front-side surfaces of the base substrate provided with one or more layers can be sealed with a resin.

Instead of the coating of the adhesion promoter layer in combination with the decorative sputter layer and the final topcoat, a further decorative coating layer or a print in the secondary color can be applied in order to generate the second color. It must be ensured here that the second color is radar-transparent and adheres sufficiently to the underlying layer.

If the second color layer is selected appropriately, it may be possible to dispense with the adhesion promoter layer and/or with a concluding topcoat.

In a further aspect, the invention relates to a laminate having a base substrate made from a transparent plastic, in particular from polycarbonate, a coating on the base substrate made from a transparent resin layer, in particular from polyurethane, and a coating layer applied directly on a surface of the base substrate facing away from the resin layer, where the coating layer is a solid-color coating layer. Preferably, a laserable, i.e., a laser beam-machinable or -removable, solid-color coating material is used. The shade of the solid-color coating material corresponds to the basic shade of the desired metallic finish.

The solid-color coating layer may contain introduced passages which extend from a side of the solid-color coating layer facing the resin layer to a side of the solid-color coating layer facing away from the resin layer. Alternatively or additionally, introduced recesses may be present which extend from a side of the solid-color coating layer facing away from the resin layer partially into the solid-color coating layer.

The passages and/or recesses can have different sizes. In other words, the passages and/or recesses may have sizes that differ from each other in their spatial extent along the surface of the solid-color coating layer and in their shape, and, for example, they may be round, elongate, etc., in form.

The passages and/or recesses in their extent longitudinally to the solid-color coating layer can have a size of less than 0.5 mm.

The passages and/or recesses can be distributed evenly over the area of the solid-color coating layer.

The passages and/or recesses can be distributed without any recognizable pattern over the area of the solid-color coating layer.

A transparent heating foil can be integrated between the base substrate and the resin layer.

Furthermore, the heating foil can be covered over the full area with the resin layer, with the heating foil being completely embedded, between the resin layer and the base substrate.

On the coating layer, a transparent adhesion promoter layer may be provided, in particular in a layer thickness of 5 μm to 50 μm.

A decorative layer of a semiconductor may have been applied to the transparent adhesion promoter layer or directly to the solid-color coating layer, by means of physical vapor deposition (PVD), in particular by means of sputtering. By applying the decorative layer directly to the solid-color coating layer, an optical gloss effect can be generated. In contrast, an optical matt effect, with which fabrication defects and contamination are optically concealed, can be generated by using an adhesion promoter layer.

A non-transparent topcoat can be applied on the decorative layer by means of spraying processes.

The front-side surfaces of the base substrate provided with one or more layers, including the base substrate, are sealed with a resin.

The advantages of the invention are reproduced in summary below. Advantages mentioned with reference to the process also apply to the laminate and vice versa.

By production of a laminate in a multicomponent process, a multilayered component can be generated which is used as a front kidney or front grille with integrated radome function. This design allows the component to provide significantly better radar functionality while at the same time optimizing the heating function. In addition, a separate component is eliminated, a unique 3D effect is generated, and a special design with depth effect is made possible. The selective removal of the first coating layer allows variation of the patterns and also individualization. With this process, a radome can be integrated into a complete front grille/front kidney of a vehicle and thus a gapless appearance can be presented. A reduction in gaps on the outer skin of the vehicle also improves the aerodynamic properties of the vehicle and, moreover, reduces the fuel consumption. All layers are optimized in terms of layer thickness for the best radar penetration and in the overall integration generate sufficient adhesion over the entire service life of the vehicle. The production process for the base substrate is chosen such that component separation by the foil is not perceptible, with the size of the integrated foil being smaller than the complete component. In the region of the radar field of view, the finished blank (base substrate, resin layer and heating) has a constant wall thickness. Outside the radar field of view, this design allows the back-side wall thickness of the plastic component to be varied in such a way that patterns with a 3D depth effect are created which, due to the plastics-technological design and the resin layer on the outer side, do not adversely affect the class-A surface of the component. The wall thickness of the base substrate can be varied depending on the initial wall thickness—for example, a wall thickness discontinuity of up to 3.0 mm with an initial wall thickness of 5.2 mm. The wall thickness of the resin layer on the front side of the component must be selected such that it is at least 0.5 mm. On the one hand, shrinkage effects can be concealed by this wall thickness; on the other hand, the resin layer is chosen such that it exhibits a self-healing effect in the event of scratches or spots, through heat exposure or time. With the invention, radomes can be presented not only in solid colors, but also in metallic color effects. Metallic finishes are solid-color coating materials to which metallic particles have been added, which provide the corresponding metallically lustrous effect. Metallic finishes on a radome shield impair radar function, owing to the metallic particles in the paint, and therefore cannot be used. By virtue of the passages and/or depressions, radomes can be realized in a metallic esthetic. When using conventional metallic finishes, the metallic particles of the corresponding metallic auto paints would negatively affect the radar permeability. In addition, certain design surfaces can be represented in metal or chrome esthetics, via foils or PVD coatings for example. By virtue of the ultrafine laser-made passages in the solid-color coating material, the light in the case of this component, as for a metallic finish, is able to impinge on a metallic surface, from which it is reflected, creating the typical metallic effect. The use of semiconductor materials for the PVD coating leaves the radar functionality unaffected.

The invention is explained in more detail below, using the description of the FIGURE.

BRIEF DESCRIPTION OF THE DRAWING

Schematically, the FIGURE shows a section through a laminate according to the invention.

DETAILED DESCRIPTION OF THE DRAWING

The FIGURE shows a sectional view through a laminate 10, which was produced in a multicomponent process and which is used as a radome. The radome 10 can be used as an exterior trim part of a vehicle and conceals a radar sensor 20, which is located in the interior of the vehicle. The radar sensor 20 located behind the radome 10 is not visible from an outer side of the vehicle.

The radome 10 has a base substrate 11. On a surface of the base substrate 11 facing away from the radar sensor 20, a resin layer 17 is applied. Between the resin layer 17 and the base substrate 11, a heating foil 16 is arranged at least sectionally. With the heating foil 16, the outer surface of the resin layer 17, and thus of the radome 10, can be temperature-conditioned, in particular heated, to defrost deposits such as rainwater, ice or snow. Furthermore, the heating foil can be controlled such that a temperature is induced in the resin layer 17 at which a self-healing process is triggered, by which damage in the surface of the resin layer, such as scratches or pores, is closed.

On the back side of the substrate 11, i.e., on a surface of the substrate 11 facing the radar sensor 20, a coating layer 12 is applied. This coating layer has passages or recesses 19, 19', which are arranged in the form of a pattern. By means of the coating layer 12, the radome can be generated with a coloration visible from the outside. On the surface of the coating layer 12 which faces away from the base substrate 11, an adhesion promoter layer 13 is applied. A decorative layer 14 is applied to the adhesion promoter layer, and is recognizable from an outside of the vehicle or from an outside of the radome 10 through the recesses 19, 19' in the coating layer 12. Hence a two-color effect of the radome can be generated. On a side of the decorative layer 14 facing the radar sensor 20, a final layer composed of a non-transparent topcoat is applied. The end faces of the layers and of the base substrate can be sealed with a resin 18. Preferably, the resin 18 in the circumferential direction completely surrounds the radome 10 or the base substrate 11 and all the layers 12, 13, 14, 15 and 17. In order to avoid stray light, the resin 18 may preferably be made of black material.

The operation of the radome 10 will be briefly explained below. The radar sensor 20 emits radar waves in an emission direction E. These radar waves pass through the radome 10 from a back side, starting with the non-transparent topcoat layer 15 and ending with the resin layer 17. After leaving the radome through the resin layer 17, the radar waves impinge on an object 30 located in front of the radome or in front of the vehicle. The radar waves are reflected at this object 30 and pass through the radome in a direction of reflection R. They traverse the radome in the opposite direction, this time from the resin layer 17 to the topcoat 15. After leaving the radome 10 through the topcoat 15, they are collected again by the radar sensor 20.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a laminate in a multicomponent process, comprising the steps of:

generating a base substrate from a transparent plastic;

coating the base substrate with a transparent resin layer; and applying a solid-color coating layer directly on a surface of the base substrate facing away from the transparent resin layer; and introducing: passages through the coating layer and/or recesses partially through the coating layer, wherein at least some of the passages and/or recesses have different sizes in the plane of the coating layer.

2. The method according to claim 1, wherein the passages and/or the recesses in a respective extent longitudinally to the solid-color coating layer have a size of less than 0.5 mm.

3. The method according to claim 1, wherein the passages and/or the recesses are distributed evenly over an area of the solid-color coating layer.

4. The method according to claim 1, wherein the passages and/or the recesses are distributed without any recognizable pattern over an area of the solid-color coating layer.

5. A laminate, comprising:

a base substrate made from a transparent plastic;

a coating on the base substrate made from a transparent resin layer; and a solid-color coating layer applied directly on a surface of the base substrate facing away from the transparent resin layer; and passages through the coating layer and/or recesses partially through the coating layer, wherein at least some of the passages and/or recesses have different sizes in the plane of the coating layer.

6. The laminate according to claim 5, wherein the passages and/or the recesses have different sizes.

7. The laminate according to claim 5, wherein the passages and/or the recesses in a respective extent longitudinally to the solid-color coating layer have a size of less than 0.5 mm.

8. The laminate according to claim 5, wherein the passages and/or the recesses are distributed evenly over an area of the solid-color coating layer.

9. The laminate according to claim 5, wherein the passages and/or the recesses are distributed without any recognizable pattern over an area of the solid-color coating layer.

* * * * *